United States Patent [19]

Herrmann et al.

[11] Patent Number: 5,046,332
[45] Date of Patent: Sep. 10, 1991

[54] REFRIGERATION UNIT, IN PARTICULAR A REFRIGERATOR OR THE LIKE

[75] Inventors: Franz Herrmann, Olaz/Navarra, Spain; Udo Wenning; Theo Haftlmeier, both of Giengen, Fed. Rep. of Germany

[73] Assignee: Bosch-Siemens Hausgeräte GmbH, Munich, Fed. Rep. of Germany

[21] Appl. No.: 557,633

[22] Filed: Jul. 25, 1990

[30] Foreign Application Priority Data

Jul. 25, 1989 [DE] Fed. Rep. of Germany ....... 3924589

[51] Int. Cl.$^5$ .............................................. F25D 3/12
[52] U.S. Cl. .......................................... 62/388; 62/78
[58] Field of Search ................... 62/78, 382, 388, 480

[56] References Cited

U.S. PATENT DOCUMENTS

| 2,894,845 | 7/1959 | Stooddard | 62/78 X |
| 3,102,777 | 9/1963 | Bedrosian et al. | 62/78 X |
| 3,102,779 | 9/1963 | Brody et al. | 62/78 X |
| 3,415,310 | 12/1968 | Kuhlmann | 62/78 X |
| 3,922,878 | 12/1975 | Jalali | 62/388 X |
| 4,537,043 | 8/1985 | Volker et al. | 62/78 X |
| 4,860,555 | 8/1989 | Bishop et al. | 62/78 X |

*Primary Examiner*—Lloyd L. King
*Attorney, Agent, or Firm*—Herbert L. Lerner; Laurence A. Greenberg

[57] ABSTRACT

A refrigeration unit, especially a refrigerator or the like, includes a useful space. At least one container at least partially occupies the useful space for storing perishables. A device lowers pressure prevailing in the at least one container by partial aspiration of a remaining air volume surrounding the perishables. A device fills the at least one container with a gas atmosphere for increasing the storage life of the stored perishables.

10 Claims, 1 Drawing Sheet

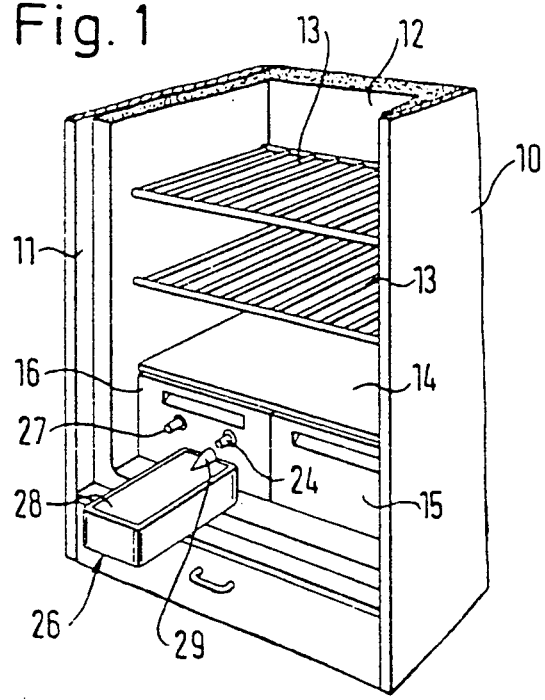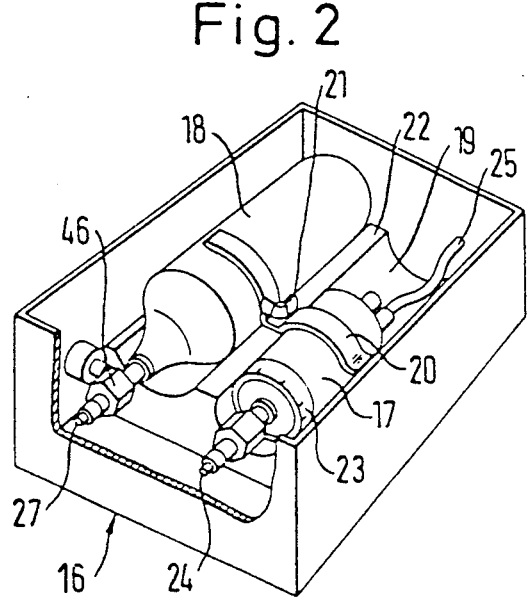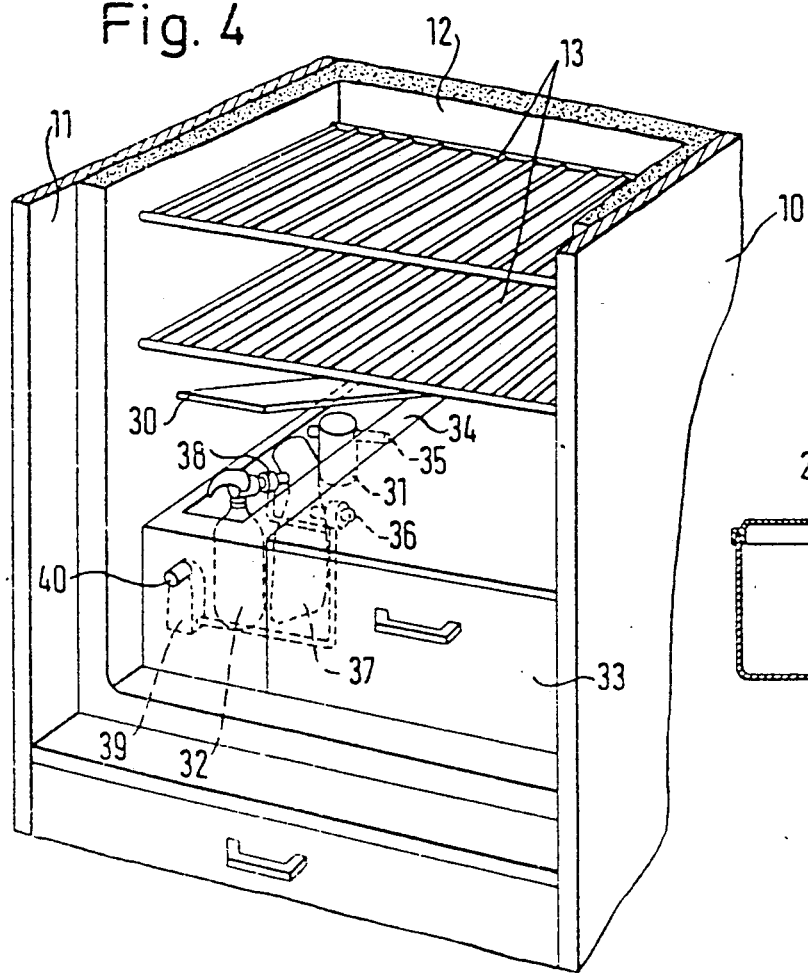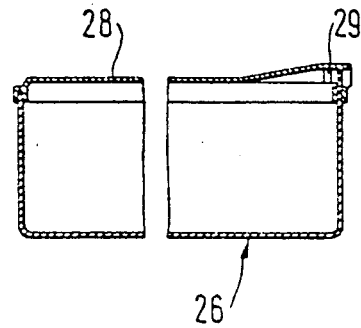

REFRIGERATION UNIT, IN PARTICULAR A REFRIGERATOR OR THE LIKE

The invention relates to a refrigeration unit, in particular a refrigerator or the like, including a useful space being at least partially occupied by one or more containers having a valve device and being closable in a pressure proof manner, the containers being in the form of fixedly installed compartments and/or removable containers, canisters and the like for storing perishables, and a device for lowering the pressure prevailing in the containers by aspirating some of the remaining air volume surrounding the perishables.

In known refrigeration units of the above-described type, a residual volume of air which is not positively displaced from the closed container by the material placed therein to be cooled, is brought to a low pressure level by aspiration using an evacuation device that is optionally permanently installed in the unit, thereby reducing the quantity of oxygen available. Such a device largely prevents changes in surface color due to oxidation processes in oxidation-sensitive perishables, and prevents the perishables from appearing unappetizing. As a result, microbial growth, which occurs to an increased extent in the presence of oxygen, can also be averted, thereby retarding the associated process of decomposition and thus considerably delaying the attendant loss in quality or even spoilage of the perishables. This advantageous effect is further reinforced by storing the perishables in a chilled condition.

In order to keep the remaining amount of oxygen in the containers as small as possible, so as to give the perishables a long shelf life, attempts are made to evacuate the oxygen as much as possible. However, that requires the use of heavy-duty and therefore expensive evacuating equipment, which occupies a correspondingly large amount of space, and also requires the use of strong containers. Due to the great wall thickness it requires, the containers are also heavy and ungainly. Moreover, they must be absolutely tight, so that the maintenance of a low pressure level can be assured even over long storage periods, in order to preclude the entry of air from the ambient atmosphere as extensively as possible. Due to the pronounced pressure drop compared with the ambient atmosphere that prevails during use, the containers must also be made from diffusion-proof material and must have an additional device to enable breaking of the vacuum prevailing therein when the containers are to be opened Although compared with conventional refrigeration units, major advantages in terms of a considerably longer storage life for the perishables are attainable in refrigeration units of the particular type described above, they have nevertheless failed to gain widespread acceptance, because of the high cost previously entailed by both the evacuating apparatus and the containers themselves.

It is accordingly an object of the invention to provide a refrigeration unit, in particular a refrigerator or the like, which overcomes the hereinafore-mentioned disadvantages of the heretofore-known devices of this general type and to do so by means of simple structures, in such a way that the aforementioned advantages of refrigerated storage in a reduced-pressure atmosphere can be exploited, without having to accept the above-described disadvantages of known refrigeration equipment.

With the foregoing and other objects in view there is provided, in accordance with the invention, a refrigeration unit, especially a refrigerator or the like, comprising a useful space; at least one container at least partially occupying the useful space for storing perishables, the at least one container having a pressure-proof closure and a valve device, the at least one container being a fixedly installed compartment and/or a removable container, canister or the like; a device for lowering pressure prevailing in the at least one container by partial aspiration of a remaining air volume surrounding the perishables; and a device for filling the at least one container with a gas atmosphere for increasing the storage life of the stored perishables.

The structure according to the invention provides the known reduction of microbial risk and accordingly a lengthening of the shelf life of the perishables being stored. However, due to the use of a gas atmosphere that increases the shelf life, a further improvement is attained because the containers can be made substantially lighter and thus are easier to handle, because the pressure drop exists only briefly during the evacuation.

In accordance with another feature of the invention, the device for filling the containers has pressure canisters disposed interchangeably in the refrigeration unit, and the pressure canisters have easily accessible outlet valves that can be coupled to the valve devices of the containers.

In accordance with a further feature of the invention, the pressure canisters are gas bottles being removably disposed in a compartment of the refrigeration unit that can be pulled out like a drawer.

As a result, the pressure canister for filling the containers is readily accessible at any time and can be replaced with a full canister as needed, whenever its contents are exhausted.

In accordance with an added feature of the invention, the drawer-like compartment contains not only the pressure canister but also an evacuating device for the containers which are intended to hold the perishables.

The maintenance and handling of the unit is simplified considerably as a result.

Operation is particularly facilitated if, in accordance with an additional feature of the invention, the evacuating device is equipped with an easily accessible coupling device that can be coupled to the valve device of the containers.

In accordance with a concomitant feature of the invention, the pressure canister is provided with a device for lowering the pressure prevailing in it to the atmospheric pressure of the ambient air.

This makes it possible to fill the remaining free space after the evacuation with a gas atmosphere having a pressure which is then only slightly below the prevailing atmospheric pressure, without using a special dispensing device. As a result, the containers can be opened easily as needed. Due to the slight pressure difference as compared with atmospheric pressure that thus prevails in the container during the refrigerating phase as well, processes of diffusion that could have a negative effect on the gas atmosphere prevailing in the container are also largely precluded.

Other features which are considered as characteristic for the invention ar set forth in the appended claims.

Although the invention is illustrated and described herein as embodied in a refrigeration unit, in particular a refrigerator or the like, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is fragmentary, diagrammatic, perspective view of the lower portion of a first embodiment of a built-in type of refrigerator being installed in kitchen cabinetry, with the door having been omitted so as to better illustrate a device disposed in the interior thereof for lowering air pressure in a container for perishables having a storage life which is increased by ensuing filling with a gas atmosphere;

FIG. 2 is an enlarged, fragmentary, perspective view of devices for evacuating and filling containers, which are disposed next to one another in a drawer-like compartment of the refrigerator;

FIG. 3 is a fragmentary, sectional view of a container that is provided with a cap for storing perishables and is equipped with a valve device provided on the cap for evacuating and filling it with a gas atmosphere; and FIG. 4 is a view similar to FIG. 1 showing a second exemplary embodiment of the refrigeration unit, in which the evacuation and filling device for the containers is accommodated and concealed in a special compartment on the bottom of the refrigeration unit.

Referring now to the figures of the drawing in detail and first, particularly, to FIG. 1 thereof, there is seen a housing of a built-in refrigeration unit 12 which is mounted in an upright kitchen cabinet 10 having an installation niche 11. The built-in refrigeration unit 12 has a usable space which is closable by a non-illustrated door, and a plurality of supporting grids 13 serving as compartments for perishables being disposed above a lower supporting plate 14.

Located underneath the supporting plate 14 are two drawers 15 and 16 which are disposed alongside one another. The drawer 15 is constructed as a vegetable drawer, while the drawer 16 serves to hold an evacuating device 17 and a pressure canister 18 in the form of a gas bottle, as seen in FIG. 2. To this end, the evacuating device or pump 17 and the pressure canister 18 are located next to one another in a receptacle 19 located on the bottom of the drawer. The devices 17, 18 are retained in the receptacle 19 by a resilient bracket 20, which in the present case is secured with a wing nut 21 on a screw that in turn is anchored in a rib 22 which partitions the receptacle 19. The end of the evacuating pump 17 facing toward the front of the drawer 16, is provided with a regulating device 23 for adjusting the degree of the vacuum to be attained. The evacuating pump 17 is also equipped with a fast-action coupling 24 having a nipple which passes through an opening formed in the front panel of the drawer 16, as seen in FIG. 1. The opposite end of the evacuating pump 17 has a connection cable 25 extending toward the rear out of the drawer 16 for disposal. In contrast, the pressure canister 18 is conventionally provided with an adjustable reducing valve 46 being mounted on the neck thereof, as well as with a fast-action coupling 27 on the reducing valve. The coupling 27 likewise has a nipple that protrudes outward through an opening in the front panel of the drawer 16.

The above-described configuration serves to evacuate containers 26 which can be placed in the usable space of the refrigeration unit 12 and are intended for storing small quantities of high-quality perishables. and to fill the containers with gas. As shown particularly in FIG. 3, these containers generally have a block-like shape and can be closed with their own caps 28. The rim of the cap is conventionally provided with a groove that receives a seal, and the groove is engaged by the rim of the container 26 when the cap 28 is placed on the container. The narrow side of the cap 28 is also provided with a valve 29 that can be coupled to the nipples of the fast-action couplings 24 and 27 as well as to the evacuating pump 17 and the pressure canister 18.

With the above-described configuration, the storage life of the perishable substances stored in the container 26 can be increased considerably. To this end, after the perishable substances have been placed in the container, the remaining air volume still in the container 26 is evacuated through partial aspiration by attaching the valve 29 of the cap 28 to the nipple 24 of the evacuating pump 17, with the cap 28 on the container 26. When the evacuating pump 17 is switched on, which can take place automatically by pressing the valve 29 against the nipple 24, a partial vacuum is generated in the container 26. In this process the cap 28 is pressed tightly against the rim of the container 26 by the prevailing atmospheric air pressure. Once the degree of vacuum previously established at the adjusting device 23 has been attained, the valve 29 is disconnected from the nipple 24 and is then connected to the nipple 27 on the reducing valve 46 of the pressure canister 18. In this process, a gas atmosphere, which may include $CO_2$, $N_2$ or the like, or optionally a mixture of various gases for increasing the storage life of the perishables being stored, flows out of the pressure canister 18 and at least partially refills the reduced volume of air in the container 26. As a result, the difference between the pressure in the container 26 and atmospheric air is reduced as much as possible except for a slight negative pressure in the container, which is just enough to ensure that the cap 28 will stay closed as long as only slight pressure is exerted on it.

In the second exemplary embodiment shown in FIG. 4, a compartment that is closable by a flap 30 and is laterally offset in the lower region of the housing, is provided instead of the drawer 16. In this case, the compartment receives an evacuating pump 31 and a pressure canister 32.

Unlike the first exemplary embodiment, a container 33 for storing the perishables is inserted into the housing of the refrigeration unit 12 in drawer-like fashion, in such a way that it is located beside and separated from the compartment receiving the evacuating pump 31 and the pressure canister 32, by a partition 34. In this case, a suction nozzle 35 of the evacuating pump 31 extends through the partition 34, so that it discharges from the container 33 through the lateral surface of the partition. A magnetic valve 36 is also disposed in the partition 34. The valve 36 closes the outlet of a foil bag 37 that serves as a temporary container for the gas atmosphere. The bag is disposed in the compartment that receives the evacuating pump 31 and the pressure canister 32 and has another end which is connected to a pressure-reducing valve 38 that in turn is located at the outlet of the pressure canister 32. Like the evacuating pump 31, the magnetic valve 36 and the pressure-reducing valve 38 can be triggered by a diagrammatically-illustrated control apparatus 39 which can be tripped with an actuating button 40 located in the front panel of the compartment.

In the last exemplary embodiment described above, the container 33 for storing the perishables is removed from the housing under a cover plate that closes it in an airtight manner and it is then returned to a position of repose. Subsequently, by actuation of the button 40 and by means of the thus-tripped control apparatus 39, the evacuating pump 31 is put into operation, causing the container 33 to be evacuated through the suction nozzle 35. After the evacuation, again under the influence of the control apparatus 39 the pressure-reducing valve 38 is briefly opened and as a result the gas that increases the storage life of the perishables being stored initially flows out of the pressure canister 32 into the foil bag 37 and inflates it only to such an extent that a slight pressure drop still prevails as compared with atmospheric pressure. Upon the ensuing opening of the magnetic valve 36 under the control of the control apparatus 39, the gas stored in the foil bag 37, which is virtually expanded to atmospheric pressure, is then aspirated into the container 33 because of the negative pressure then prevailing in the container 33. This process is optionally repeated until such time as a pressure equilibrium with respect to atmospheric pressure has virtually been established in the container 33.

Deviating from the second exemplary embodiment shown and described above, the container 33 may instead be equipped with a separate cap. However, given the intended size of the container 33 in this case and the large-area cap required therefor, it is more advantageous from the standpoint of sturdiness to insert the container into a closed compartment that can be closed in an airtight manner when the container is placed at the opening thereof.

In both cases which are described and shown, it is particularly important that a pressure equilibrium with respect to atmospheric pressure be provided in the containers 26 and 33 after the evacuation, because the gas that increases the storage life of the stored perishables is aspirated from the pressure canister 18 and 32. Since the gas being stored in the pressure canister 18 or 32 is initially expanded to atmospheric pressure as intended, only just enough gas is aspirated into the previously evacuated containers 26 or 33 to correspond to the volume of air remaining and the stored perishables, in these containers. A small persistent pressure difference that still remains then assures that the containers remain closed and do not allow atmospheric air with a corresponding proportion of oxygen to enter. Again deviating from the exemplary embodiments which are shown and described, it is also possible to place one or more pressure canisters 18 and optionally also the evacuation pump 17, along with the device for evacuating and filling the containers 26 with gas, in the door of the built-in refrigerator 12, which in such a case is equipped with suitable receptacles.

We claim:

1. A refrigerator with a storage space, comprising at least one container at least partially occupying the storage space for storing perishables; a pressure-proof closure and a valve device associated with said container for closing said container in a pressure-proof manner; a device for partially evacuating a remaining air volume surrounding the perishables in said at least one container for lowering the pressure prevailing in said at least one container; and a device for filling said at least one container with a gas atmosphere for increasing the storage life of the stored perishables.

2. The refrigerator according to claim 1, wherein said at least one container is a fixedly installed compartment.

3. The refrigerator according to claim 1 wherein said at least one container is a removable container.

4. The refrigerator according to claim 1, wherein said at least one container s a removable canister.

5. The refrigerator according to claim 1, wherein said device for filling said at least one container includes an interchangeable pressure canister having an easily accessible outlet valve to be coupled to said valve device 6. The refrigerator unit according to claim 5, including a drawer, said pressure canister being a gas bottle removably disposed in said drawer.

7. The refrigerator unit according to claim 6, wherein said device for lowering pressure in said at least one container is an evacuating device for said at least one container being disposed in said drawer along with said pressure canister.

8. The refrigerator unit according to claim 9, wherein said evacuating device includes an easily accessible coupling device to be coupled to said valve device 9. The refrigerator unit according to claim 1, wherein said device for filling said at least one container includes a pressure canister having a device for lowering pressure prevailing in said pressure canister to atmospheric pressure of ambient air.

10. Refrigerator having a storage space, comprising at least one container at least partially occupying the storage space for storing perishables, said at least one container having a pressure-proof closure and a valve device; a device to be connected to said valve device for partially evacuating a remaining air volume surrounding the perishables for lowering pressure prevailing in said at least one container; and a device to be connected to said valve device for filling said at least one container with a gas atmosphere for increasing the storage life of the stored perishables.

* * * * *